United States Patent
Espunes

[15] 3,698,513
[45] Oct. 17, 1972

[54] PROCESS FOR THE LUBRICATION OF MECHANICAL SYSTEMS SUBJECTED TO VERY HIGH CONTACT PRESSURE

[72] Inventor: Luis Arizmendi Espunes, Madrid, Spain

[73] Assignee: Instituto De Quimica Fisico Rocasolano, Madrid, Spain

[22] Filed: Sept. 24, 1970

[21] Appl. No.: 74,978

[52] U.S. Cl. ..................184/5, 184/1 E, 184/6.22, 308/5 R, 308/DIG. 9
[51] Int. Cl. .............................................F01m 15/00
[58] Field of Search.......308/5 R, DIG. 9; 184/1 E, 5, 184/6.22; 252/12, 28; 192/21.5

[56] References Cited

UNITED STATES PATENTS

| | | | |
|---|---|---|---|
| 3,072,444 | 1/1963 | Klass | 184/1 E |
| 3,140,779 | 7/1964 | Dalton et al. | 252/12 X |
| 3,240,994 | 3/1966 | Stuetzer | 192/21.5 X |
| 3,385,793 | 5/1968 | Klass et al. | 192/21.5 X |

Primary Examiner—Manuel A. Antonakas
Attorney—Richard P. Alberi

[57] ABSTRACT

A process for utilizing molten glass as a lubricant in mechanical systems that have to meet demanding and specific load conditions. A film of lubricating glass is provided between mating surfaces, and this glass is heated to maintain it in a molten state. The contact pressure between the mating surfaces is determined, and the temperature of the glass is controlled as a function of the contact pressure in order to control the viscosity of the molten glass so that hydrodynamic lubrication can be obtained under the conditions of contact pressure to which the mating surfaces are subjected.

2 Claims, 1 Drawing Figure

PATENTED OCT 17 1972　　3,698,513
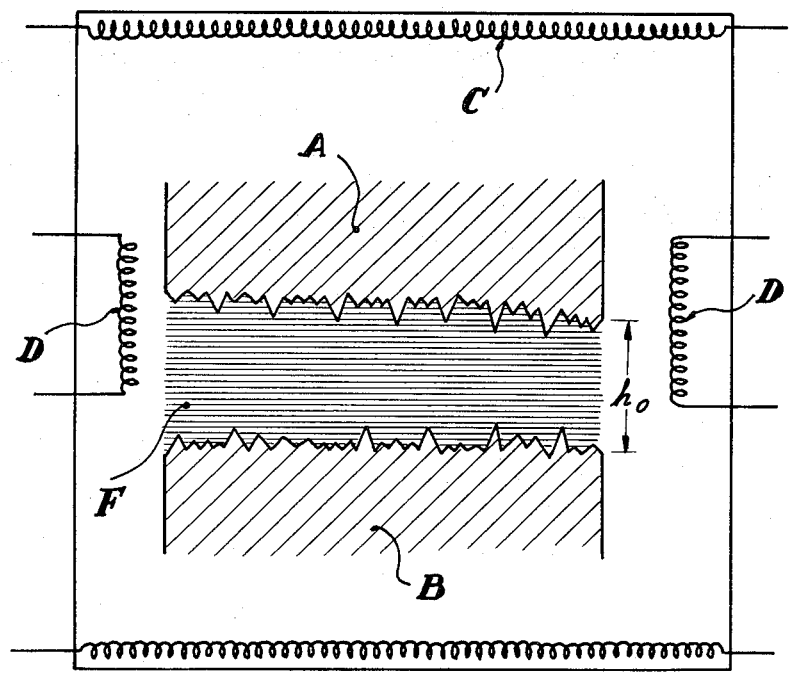
LUIS ARIZMENDI ESPUÑES   INVENTOR
BY   *Richard P. Alben*
　　　　ATTORNEY

PROCESS FOR THE LUBRICATION OF MECHANICAL SYSTEMS SUBJECTED TO VERY HIGH CONTACT PRESSURE

The application of powdered glass as an additive for lubricating oils and greases for use on sliding surfaces subjected to high pressure, as well as the process for the manufacture of powdered glass have constituted the subject of extensive studies on the part of the applicant, which have materialized in their corresponding patents of invention.

The purpose of the present invention is to make possible the utilization of directly melted glass as a lubricant for mechanical systems that have to meet very demanding and specific load conditions, or external pressures of a very low order, or high temperatures. In effect, with molten glass there becomes available a fluid medium with a very high viscosity which is adjustable by heating by means of electronic servo-systems to maintain this variable at all times at the most appropriate value so that the mechanism to be lubricated can meet the mechanical conditions required of it by its special utilization.

The possibility of obtaining glasses of the most diverse compositions, within a wide range of melting points, converts these substances into a lubricant the future of which has scarcely been suspected. The hydrodynamic system can be maintained indefinitely thanks to the fact that at the high viscosities that can be availed of, the separation between the surfaces will always be superior to the height of the roughness of the metals, so that the coefficient of friction will be exclusively due to the shearing of the molten glass. The order of magnitude of the loads that systems lubricated in this manner are able to support can increase to an unsuspected extent.

For the purpose of making it possible for the invention to be better interpreted, in what follows there is described an example for its practical application in which references are made to the attached drawing, which example is included merely by way of indication and is not limitative of the invention. In the said drawing there are shown schematically and highly amplified in order to make their roughness visible, the sliding surfaces corresponding to two mechanical elements A and B which are to be subjected to relative movement in conditions of pressure and environment that considerably exceed those that conventional lubricants with and without additives resist.

Prior to the starting up of the mechanical system, it is heated, preferably by high frequency induction, until it reaches a temperature somewhat higher than that of the melting-point of the glass that is to be used.

The glass is supplied in a molten state directly to the system so that both the heating of both the former and the latter, represented schematically by the coils C and D, is electronically coordinated so that the starting up and the normal regime of operation are regulated in consonance with the pressure and conditions to which the moving mechanical system is to be subjected.

The molten glass then acts as a lubricating grease of very high viscosity which completely fills the valleys formed by the roughnesses of the said surfaces.

The layer F of melted glass, which is constantly renewed, due to its high and thermo-adjustable viscosity maintains a separation $h_0$ between both surfaces which depends, according to the equations of Reynolds, on the square of the viscosity, so that contact between the metal parts is prevented, thus reducing the friction and the wear and tear of the said parts.

When the system is stopped and eventually cooled to ambient temperature, any molten glass remaining between the mating surfaces will solidify and make disassembly of the mating parts difficult. Consequently, it may be desirable to remove the glass joining the surfaces before the glass solidifies. The electronic control system can be designed to permit the removal of the molten glass after the system is relieved of its operating pressure when the system is to be stopped. By maintaining the glass in a heated, fluid state and allowing a slight increase in the distance ($h_0$) separating the mating surfaces, the molten glass can be drained or otherwise removed from the system prior to cooling.

The fact is not concealed, however, that this system of lubrication will have to be restricted, for the time being, to very specific cases, and that it will determine changes in the designs of the elements to be lubricated and in the nature of the materials that constitute them, although we consider that this will not represent too serious an obstacle in view of the benefits that the conception of a lubricant with these characteristics can provide. Fortunately the mentality which consists of designing mechanisms to fit them to specific lubricants is no longer new by comparison with that traditionally opposed which consists of obtaining lubricants for conventional mechanisms. The environmental conditions and the stresses of the present era determine this new conception in the resolution of problems of friction.

Consequently, on the basis of the essence of the invention and of the application described hereinbefore, it is possible to develop various devices to obtain the same results, specially with regard to the manner of heating the mass of glass.

What is claimed is:

1. A process for lubricating mating surfaces subjected to motion relative to each other under high contact pressure in a mechanical system, comprising the steps of: providing a film of lubricating glass between said mating surfaces; determining the contact pressure to which said mating surfaces are subjected; heating said glass to maintain said glass in a molten state; controlling the temperature of said glass as a function of said contact pressure, whereby the viscosity of said molten glass is controlled to provide continuous hydrodynamic lubrication of said mating surfaces under the conditions of contact pressure to which said surfaces are subjected.

2. The process as claimed in claim 1, including the steps of removing said hot, molten glass after said system is relieved of its operating pressure when said system is to be stopped.

* * * * *